(12) United States Patent
Brown et al.

(10) Patent No.: US 8,397,208 B2
(45) Date of Patent: Mar. 12, 2013

(54) METHOD AND SYSTEM FOR BASELINING ACROSS MULTIPLE DOMAINS

(75) Inventors: Gary Brown, Austin, TX (US); Mir Derakhshan, Bengeo (GB); Kerstin Baird, Portland, OR (US)

(73) Assignee: Serena Software, Inc., San Mateo, CA (US)

( * ) Notice: Subject to any disclaimer, the term of this patent is extended or adjusted under 35 U.S.C. 154(b) by 1571 days.

(21) Appl. No.: 11/849,081

(22) Filed: Aug. 31, 2007

(65) Prior Publication Data

US 2008/0059942 A1 Mar. 6, 2008

Related U.S. Application Data

(60) Provisional application No. 60/841,967, filed on Aug. 31, 2006, provisional application No. 60/845,009, filed on Sep. 15, 2006.

(51) Int. Cl.
*G06F 9/45* (2006.01)
(52) U.S. Cl. .................................... 717/101
(58) Field of Classification Search .................. 717/101
See application file for complete search history.

(56) References Cited

U.S. PATENT DOCUMENTS

| 5,421,012 A | * | 5/1995 | Khoyi et al. | 718/107 |
|---|---|---|---|---|
| 7,028,225 B2 | | 4/2006 | Maso et al. | |
| 7,096,465 B1 | * | 8/2006 | Dardinski et al. | 717/178 |
| 7,607,164 B2 | | 10/2009 | Vasishth et al. | |
| 7,984,420 B2 | * | 7/2011 | Eldridge et al. | 717/108 |
| 2009/0118845 A1 | * | 5/2009 | Eldridge et al. | 700/86 |

* cited by examiner

*Primary Examiner* — John Chavis
(74) *Attorney, Agent, or Firm* — Hickman Palermo Truong Becker Bingham Wong LLP; Edward A. Becker

(57) ABSTRACT

Techniques are provided for baselining across multiple domains. Relationship information that associates a collection of requirement objects with a set of configuration management objects is stored. The collection of requirement objects is defined in a requirement management system for a software product, and the set of configuration management objects is defined in a configuration management system that is operable to manage the development of the software product. A particular requirement object from the collection of requirement objects is determined. Based on the relationship information, one or more configuration management objects that are associated with the particular requirement object are determined. A baseline that includes copies of the one or more configuration management objects is created and stored, where the copies include specific versions of the one or more configuration objects.

26 Claims, 5 Drawing Sheets

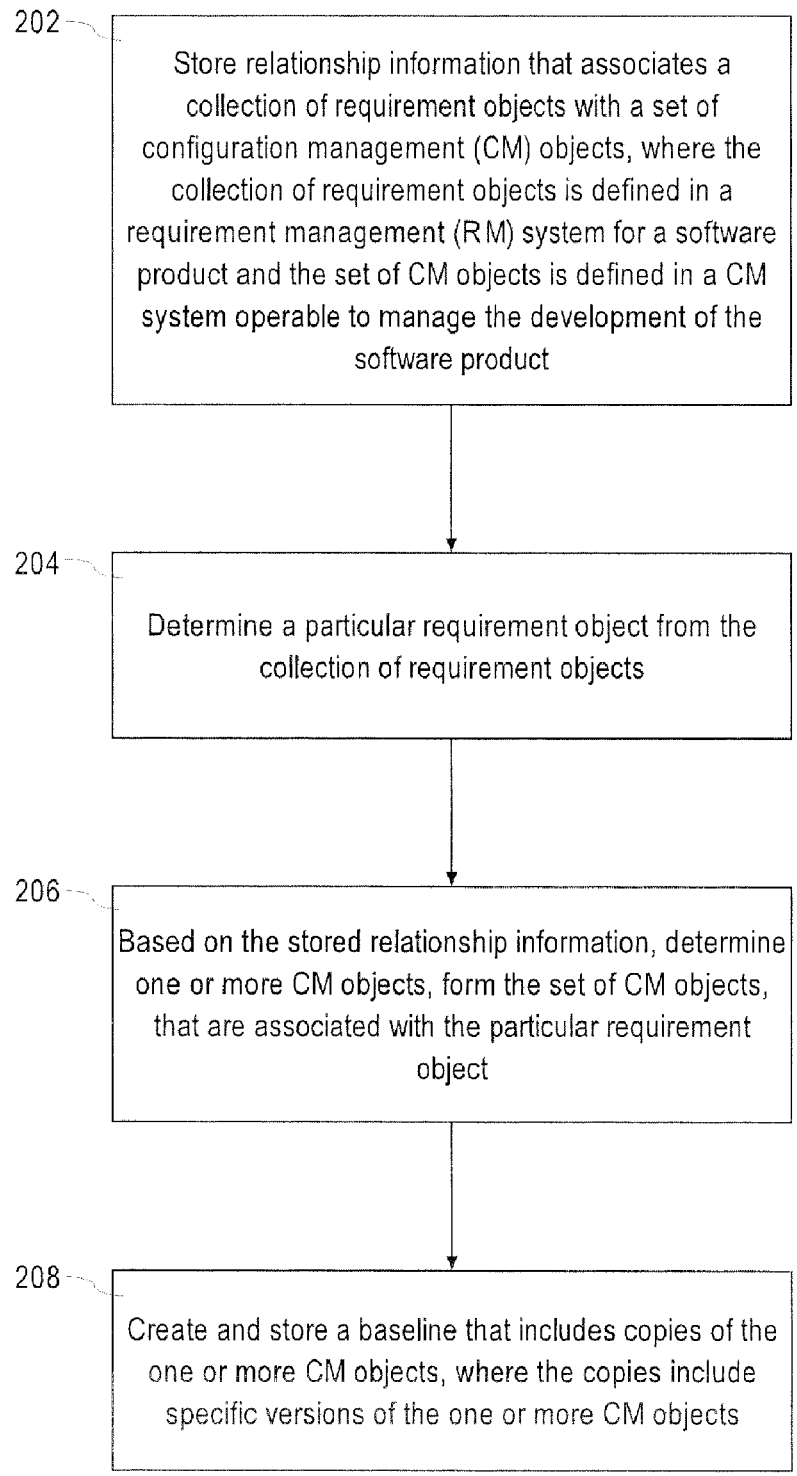

METHOD AND SYSTEM FOR BASELINING ACROSS MULTIPLE DOMAINS

PRIORITY CLAIMS

This application claims priority under 35 U.S.C. 119(e) to U.S. Provisional Patent Application Ser. No. 60/841,967, entitled "METHOD AND SYSTEM FOR IDENTIFYING SUSPECT LINKS BETWEEN OBJECTS", filed by Gary Brown et al. on Aug. 31, 2006, the entire content of which is hereby incorporated by reference for all purposes as if fully set forth herein.

This application claims priority under 35 U.S.C. 119(e) to U.S. Provisional Patent Application Ser. No. 60/845,009, entitled "METHOD AND SYSTEM FOR BASELINING ACROSS MULTIPLE DOMAINS", filed by Gary Brown et al. on Sep. 15, 2006, the entire content of which is hereby incorporated by reference for all purposes as if fully set forth herein.

FIELD OF THE INVENTION

This invention relates generally to software development.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Traditionally, different disciplines of software development are managed separately by different groups of users. The different groups of users involved in software development use different applications and tools to perform different tasks. For example, business managers traditionally use a Requirement Management (RM) tool to articulate and list all the requirements for a software product. When the requirements are finalized, the business managers typically provide the requirements to software engineers in the form of reports, e-mails, and/or other types of requirement documentation. Based on the provided requirements, the software engineers typically use a Configuration Management (CM) tool to design, set up, and version-control one or more software projects and deliverables that implement these requirements in the software product.

The above traditional approach of software development is based on compartmentalizing the tasks performed by the different groups of users involved in the software development. Each group of users typically uses applications and tools that facilitate efficient performance of only those tasks and functions of the software development process that are assigned to that group. For example, business managers traditionally do not need information from a CM tool because the business managers would not perform any functions or tasks for designing and implementing the software product. Similarly, software engineers traditionally do not need information from a RM tool because software engineers would typically not perform any functions or tasks for determining and articulating the requirements for the software product.

One disadvantage of the traditional approach of software development is that there is no efficient way of managing those functions or tasks that involve multiple software development disciplines. For example, the traditional approach does not provide an efficient mechanism of determining how a particular requirement is actually implemented in the software product. In order to determine which software components, modules, libraries, and/or files implement a particular feature of a software product, a business manager would need to review the requirement documentation in which the particular requirement was communicated to the software engineers. The business manager would then need to review information stored in a CM tool to determine which software components or files implement the particular requirement in the software product. Similarly, in order to determine by whom or why a particular requirement was specified for the software product, a software engineer would need to review the requirement documentation in which the particular requirement was communicated from the business managers, and then review the information stored in a RM tool to determine why the particular requirement was specified for the software product.

Another disadvantage of the traditional approach of software development is that after a product is completed and released to the customers, there is no efficient mechanism of evaluating how a particular change to the requirements implemented in the software product would affect an effort to re-develop the software product to include the particular change.

The disadvantages of the traditional approach of software development described above are not unique only to the requirement management and configuration management disciplines of software development. Rather, similar disadvantages may be encountered in other software development disciplines such as, for example, marketing management, customer service management, testing management, and product release management.

BRIEF DESCRIPTION OF THE DRAWINGS

In the figures of the accompanying drawings like reference numerals refer to similar elements.

FIG. 2 is a flow diagram that illustrates a method for baselining across multiple software development domains according to an example embodiment.

DETAILED DESCRIPTION

Figure 1A:
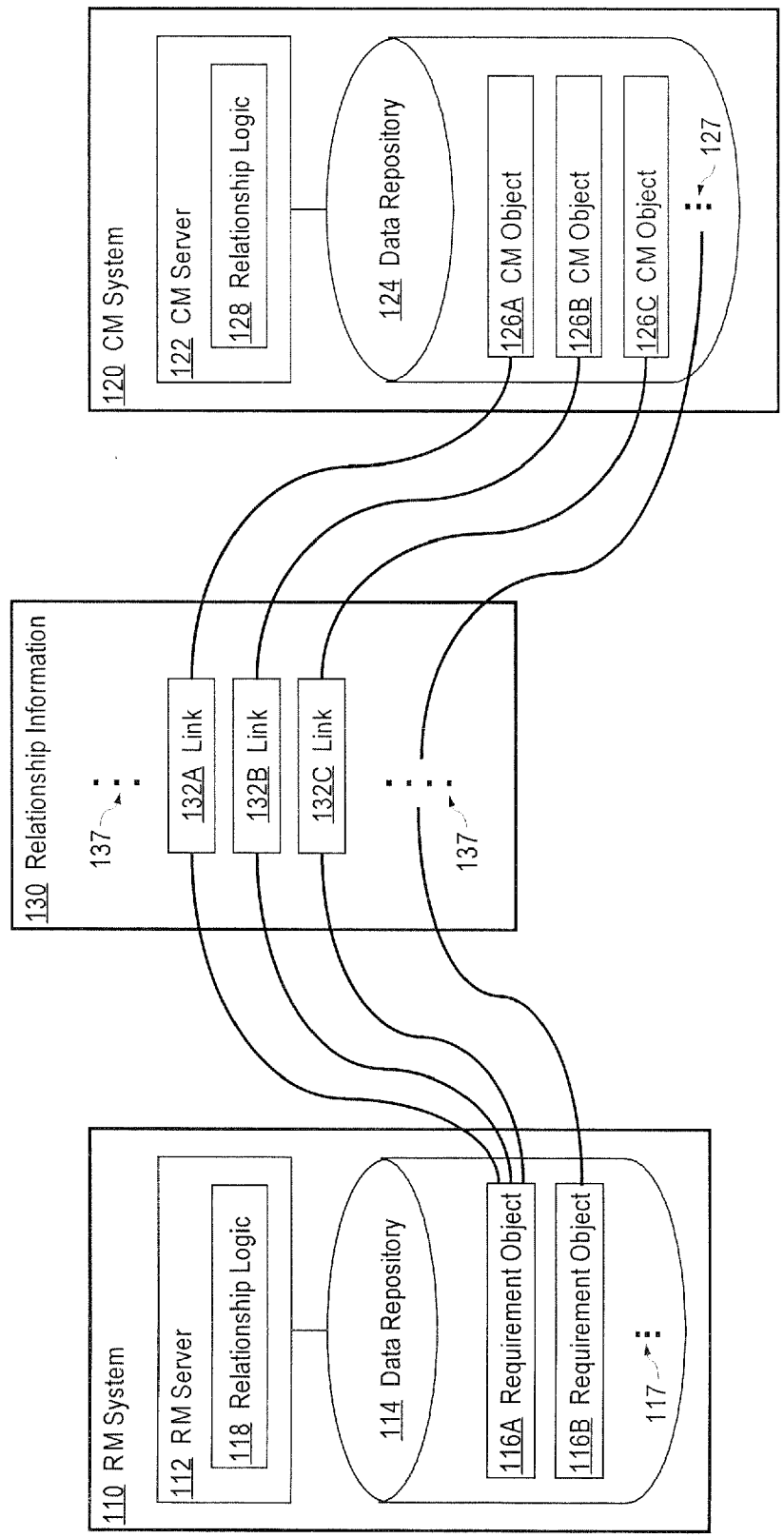
FIG. 1A is a block diagram that illustrates an operational context according to an example embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. EXAMPLE OPERATIONAL CONTEXT
III. REQUIREMENT OBJECTS
IV. CONFIGURATION MANAGEMENT (CM) OBJECTS
V. BASELINES ACROSS MULTIPLE DOMAINS
VI. SUSPECT LINKS

VII. TRACEABILITY
VIII. ADDITIONAL FEATURES AND ALTERNATIVE EMBODIMENTS
IX. IMPLEMENTATION MECHANISMS

I. Overview

As used herein, "requirement" refers to an official, binding description or specification of a characteristic or feature that a software product needs to have and/or plans to achieve. "Requirement management" (RM) refers to a process by which a software engineering project records and maintains the collection of requirements for a software product that is implemented by the project. A RM system is operable to allow users to capture and organize requirements data, and to provide the tools to create, manage, and track such requirements data throughout a project's lifecycle. Tracking project requirements across different organizations and software development disciplines and understanding the impact that various requirements have on cost, schedule, and time-to-market can have a dramatic effect on project success. Typically, in a RM system, requirements are stored in a data repository such as a database. The requirements for a project can come from various sources including, but not limited to, customers, management, marketing, Quality Assurance (QA), customer support, and field personnel. The requirements in a RM system may be entered directly by a user, or imported from outside documents or files.

As used herein, "configuration management" (CM) refers to a process by which a software engineering project records and maintains the set of project files and other project objects that are used to implement a software product. A CM system is operable to control and manage software project development by supporting various development functionalities including, without limitation, versioning of project files, providing components for building executable project files, and controlling access to project files. For example, a CM system may be operable to allow users to check-in and check-out project files, and to assign versions to project files and other project objects automatically or based on user input.

One of the basic functionalities of a CM system is the ability to generate baselines. As used herein, "baseline" refers to a stable, unchangeable collection of data entities. A baseline may be regarded as a "snapshot" that includes copies of data entities as of a particular time or stage in the lifecycle of software development. Typically, a CM system is operable to create and store baselines of source files, change requests, and/or other CM objects.

According to the traditional approach of software development, RM functions and CM functions are not integrated under common management because of the compartmentalization of the tasks performed by the different groups of users involved in the software development. Thus, the traditional approach does not provide for generating software project baselines that are driven by changes in the product requirements or for generating baselines that include the product requirements. Furthermore, the traditional approach does not provide efficient mechanisms for identifying CM objects that may be affected by requirement changes.

Techniques for Baselining Across Multiple Domains

To address the shortcomings of the traditional approach of software development, techniques are provided herein for baselining across multiple software development domains. As used herein, "domain" refers to any discipline, application, or set of activities that exists independently and is independently involved in software development. Examples of domains include, without limitation, RM domains, CM domains, issue management domains, marketing domains, customer service domains, testing domains, and product release domains. The ability to include objects from different domains (e.g., RM and CM domains) in a baseline is referred to herein as baselining across multiple domains.

In one embodiment, a collection of requirement objects is defined in a RM system for a software product, and a set of CM objects is defined in a CM system that is operable to manage the development of the software product. As used herein, "object" refers to a set of data. "Requirement object" refers to a set of data that specifies one or more intended functional, content, and/or characteristics or features of a software product. "Configuration management object" (or "CM object") refers to a set of data that is used in the development of a software product.

In this embodiment, relationship information that associates a collection of requirement objects with a set of CM objects is stored in a data repository. A particular requirement object from the collection of requirement objects is determined, for example, by determining that a change has been made to that requirement object. Based on the relationship information, one or more configuration management objects that are associated with the particular requirement object are determined. A baseline that includes copies of the one or more configuration management objects is created and stored, where the copies include specific versions of the one or more configuration objects. A copy of the particular requirement object may also be included in the baseline.

The techniques for baselining across multiple domains described herein provide for the capability of creating and storing baselines based on changes made to software product requirements. The techniques for baselining across multiple domains allow for maintaining and tracking which requirements are associated with which CM objects, and for creating an accurate baseline that may include the specific versions of the requirements which caused the corresponding changes in the associated CM objects that are included in the baseline.

By storing relationship information between requirement objects and CM objects, the techniques for baselining across multiple domains also provide an efficient mechanism for automatically determining the lifecycle stage at which the requirements of a software product have been implemented and exactly which requirements have been implemented in a particular release of the software product. This minimizes or completely eliminates any discrepancies that may exist between what business managers and customers expect from a particular release of the software product and what the software engineers actually implemented in the particular release.

In this manner, the techniques for baselining across multiple domains provide for a new approach of software development, according to which requirements that define the functionality and characteristics of a software product drive the software development process. Thus, the process of software development is guided at a business level that is higher than the configuration management level that guides the traditional approach of software development; guiding the process of software development from a higher business level allows more flexibility and better control over many, increasingly important cross-domain development tasks while at the same time preserving the performance efficiency of compartmentalized developments tasks provided by the traditional approach to software development.

Techniques for Identifying Suspect Links

To address the shortcomings of the traditional approach of software development, techniques are also provided herein for identifying suspect links between objects managed in separate software development domains. As used herein, "suspect" means that a change in one or more objects may have affected or rendered questionable one or more other objects. For example, a change in one object is suspected to affect another object when the change may possibly require that the other object is to be changed either in content, functionality, or both. A "link" refers to a data structure that stores data indicating an association or relationship between two or more objects; thus, a link represents an instance of a relationship between two or more objects. A "suspect link" refers to a data structure that stores data, which indicates that one or more objects identified in the link are suspect.

In one embodiment, a collection of requirement objects is defined in a RM system for a software product, and a set of CM objects is defined in a CM system that is operable to manage the development of the software product. A plurality of links associating the collection of requirement objects with the set of CM objects is stored. A determination is made that a particular requirement object was changed. In response to determining that the particular requirement object was changed, one or more links of the plurality of links are automatically determined. The one or more links respectively associate one or more CM objects, of the set of CM objects, with the particular requirement object. The one or more links are then identified as suspect by storing, within each of the one or more links, data which indicates that the link has become suspect. Identifying a link as suspect is also referred to hereinafter as "marking" a link as suspect.

The techniques for identifying suspect links described herein provide an efficient mechanism for automatically performing an impact analysis of the effects that a change to a particular requirement would have on the development of a software product. For example, the techniques for identifying suspect links described herein provide for performing efficient determinations of the impact a particular requirement change would have on resource allocation and deadlines for completing a software product, and for instant feedback regarding the downstream effects of the requirement change to the associated CM objects.

By maintaining links between requirement objects and CM objects and by providing a mechanism for automatically identifying any suspect links, the techniques described herein take software development to a level at which business managers and even customers are able to fully participate along with software engineers in the software development lifecycle. This in turn provides for a higher quality of the released software products and for better customer satisfaction.

II. Example Operational Context

FIG. 1A is a block diagram that illustrates an example operational context according to one embodiment. The example operational context comprises RM system 110, CM system 120, and relationship information 130.

RM system 110 comprises RM server 112 and data repository 114, where the RM server is operatively or communicatively connected to the data repository. In general, a server is a combination of integrated software components and an allocation of computational resources (e.g., memory, CPU time, and/or disk storage space) for executing the software components. By utilizing its allocated resources, a RM server is operable to control and manage software product requirements, and to support various requirement management functionalities including, without limitation, receiving data that specifies requirements (from users and/or from outside documentation), and tracking such requirements throughout a project's lifecycle.

Data repository 114 may be any type of structured storage for storing data including, but not limited to, a relational or object-oriented database, a directory, a set of data files, and any other structured data storage. As indicated by ellipses 117, data repository 114 stores a collection of requirement objects that are created and managed by RM server 112. For example, if data repository 114 is a relational database, then requirement objects may be stored therein as records in one or more relational tables. In another example, if data repository 114 is an object-oriented database, then requirement objects may be stored therein as instances of object classes that are defined through RM server 112. In some embodiments, data repository 114 may be managed directly by RM server 112. In other embodiments, data repository 114 may be a database that is managed by RM server 112 through a database server (or through a database server API) that is operable to control access to the database and to manage storing data therein and retrieving data therefrom. Thus, the techniques described herein are not limited to any particular type of data repository or any particular mechanism for storing and accessing RM objects and other RM data in the data repository.

CM system 120 comprises CM server 122 and data repository 124, where the CM server is operatively or communicatively connected to the data repository. By utilizing its allocated resources, CM server 122 is operable to control and manage software project development by supporting various development functionalities including, without limitation, versioning of project files, configuring and managing software builds, and managing developer access to project files. For example, CM server 122 may be operable to provide components for authenticating and logging developers in and out, for maintaining developers' profiles, for versioning project files, and for checking project files in and out.

Similarly to data repository 114, data repository 124 may be any type of structured storage for storing data including, but not limited to, a relational or object-oriented database, a directory, a set of data files, and any other structured data storage. As indicated by ellipses 127, data repository 124 stores CM objects that are created and managed by CM server 122. For example, if data repository 124 is a relational database, then CM objects may be stored therein as records in one or more relational tables. In another example, if data repository 124 is an object-oriented database, then CM objects may be stored therein as instances of object classes that are defined through CM server 122. In various embodiments, data repository 124 may be managed directly by CM server 122 or through a database server (and/or a database server API) that is operable to control access to the database and to manage storing data therein and retrieving data therefrom. The techniques described herein are not limited to any particular type of data repository or any particular mechanism for storing and accessing CM objects and other CM data in the data repository.

Relationship information 130 is a set of data that associates a collection of requirement objects stored and managed in RM system 110 with a set of CM objects stored and managed in CM system 120. Relationship information 130 may be stored in any type of structured storage for storing data including, but not limited to, data repositories, databases, directories, and any other structured data storage. For example, in some embodiments, relationship information 130 may be stored in a RM data repository, such as data repository 114. In other embodiments, relationship information 130 may be stored in a CM data repository, such as data repository 124.

In yet other embodiments, some portions of relationship information 130 may be stored in a RM data repository and other portions in a CM data repository. Thus, as illustrated in FIG. 1A, relationship information 130 is not restricted to being stored in any particular data repository of any particular type. Rather, according to the techniques described herein, relationship information 130 may be stored in any structured data storage that is commonly accessible by RM and CM systems, and possibly by other management systems that are operable to manage other domains of software development.

According to the techniques described herein, relationship information 130 may comprise a plurality of links as indicated by ellipses 137. Each link is a data structure that stores data indicating an association between at least one requirement object and at least one CM object. For example, link 132A associates requirement object 116A (which is stored and maintained in data repository 114) with CM object 126A (which is stored and maintained in data repository 124). The links included in relationship information 130 may represent instances of relationships between requirement objects and CM objects that are of different cardinality. For example, relationship information 130 may include links that represent one-to-one, one-to-many, many-to-one, and/or many-to-many relationship instances between requirement object(s) and CM object(s). For illustration purposes only, FIG. 1A depicts links 132A, 132B, and 132C that represent one-to-one relationship instances between requirement object 116A and CM objects 126A, 126B, and 126C, respectively. It is noted, however, that the techniques described herein are not so limited.

The links included in relationship information 130 also allow for bi-directional searches: a user of CM system 120 would be able to find out which requirements affect a particular CM object (e.g., a source file, a change request, an open issue etc.), and a user of RM system 110 would be able to find out all CM objects that may be affected by a change to a particular requirement.

A link included in relationship information 130 may be implemented as any now-known or later-developed data structure. For example, in embodiments in which relationship information 130 is stored in a relational database, a link may be implemented as one or more records that are stored in one or more relational tables. In embodiments in which relationship information 130 is stored in object-oriented or object-relational databases, a link may be implemented as one or more database objects that are instantiated from database object classes. In embodiments in which relationship information 130 is stored in a directory, a link may be implemented as one or more directory objects. In general, the techniques described herein are not limited to implementing links as any particular type of data structure.

Figure 1B:
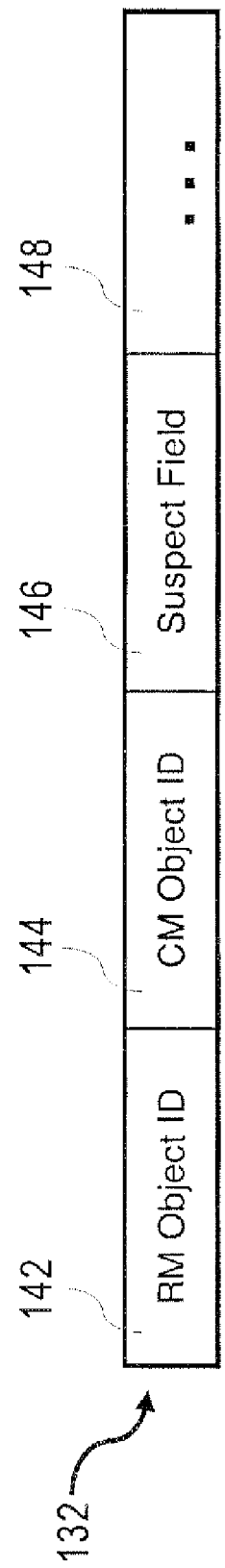
FIG. 1B is a block diagram that illustrates the structure of a link associating RM objects and CM objects according to an example embodiment.

FIG. 1B is a block diagram that illustrates the structure of a link associating a requirement object and a CM object according to an example embodiment. In this example embodiment, the relationship information associating a collection of requirement objects with a set of CM objects is stored in a relational database. Thus, link 132 is implemented as a record in a relational table. Link 132 comprises: field 142 that is operable to store the object ID of a requirement object; field 144 that is operable to store the object ID of a CM object that is associated with the requirement object identified in field 142; and field 146 that is operable to store data which indicates whether the association between the requirement object identified in field 142 and the CM object identified in field 144 is suspect. Link 132 may also comprise one or more other fields 148 that may be operable to store attribute data associated with the link and/or any other data that pertains to the association between objects represented by the link. For example, if link 132 represents a one-to-many relationship instance between one requirement object and multiple CM objects, then link 132 would comprise other fields that are operable to store data identifying the other CM objects that are associated with that requirement object. In another example, link 132 may comprise other fields that are operable to store attributes of the link including, without limitation, description of the association represented by the link, a constraint on the association represented by the link, user and/or group access rights to the link, and date and time when the link was created, stored, and/or last modified. It is noted that for illustration purposes only, FIG. 1B depicts link 132 as a record that may be stored in a relational table; however, the techniques described herein are not limited to implementing links as any particular type of data structure or in any particular type of data storage.

Referring back to FIG. 1A, RM server 112 comprises relationship logic 118 that is operable to maintain, access, and otherwise use relationship information 130 in performing the techniques described herein. Relationship logic 118 is a set of instructions which, when executed by one or more processors, are operable to perform the techniques described herein. For example, relationship logic 118 may be operable to receive information (from users and/or automatically from outside documents) that identifies an association between requirement object(s) and CM object(s) and, based on the received information, may be further operable to create and store links that represent the association. In various embodiments, relationship logic 118 may be implemented as any software component that can be executed at a computer system including, but not limited to, as a set of services provided by RM server 112, as a library of functions, as a plug-in module, as a standalone program or application, and as any other type of software component that may be invoked by or through RM server 112.

Similarly to RM server 112, CM server 122 comprises relationship logic 128 that is operable to maintain, access, and otherwise use relationship information 130 in performing the techniques described herein. Relationship logic 128 is a set of instructions which, when executed by one or more processors, are operable to perform the techniques described herein. For example, relationship logic 128 may be operable to receive information that identifies an association between requirement object(s) and CM object(s) and, based on the received information, may be further operable to create and store links that represent the association. In various embodiments, relationship logic 128 may be implemented as any software component that can be executed at a computer system including, but not limited to, as a set of services provided by CM server 122, as a library of functions, as a plug-in module, as a standalone program or application, and as any other type of software component that may be invoked by or through CM server 122.

According to the techniques for baselining across multiple domains described herein, relationship logic 118 may be further operable (either by itself or in conjunction with another component of RM server 112) to generate or cause the generation of a baseline based on a particular requirement object maintained in RM system 110. As an operational example, suppose that relationship logic 118 receives input indicating that a change was made to requirement object 116A and that the change was implemented in the CM objects associated with that requirement object. Relationship logic 118 inspects relationship information 130 to determine which CM objects are associated with requirement object 116A. For example, relationship logic 118 may search links 137 and may determine that links 132A, 132B, and 132C associate requirement object 116A with CM objects 126A, 126B, and 126C, respectively. Having identified CM objects 126A, 126B, and 126C, relationship logic 118 may then cause the generation of a baseline that includes the current copies of CM objects 126A, 126B, and 126C. For example, relationship logic 118 may itself create and store a baseline that includes the current copies of CM objects 126A, 126B, and 126C. In another example, relationship logic 118 may send a message to CM server 122 requesting that a baseline including CM objects 126A, 126B, and 126C is created and stored. In addition, in some embodiments the baseline created and stored under the direction of relationship logic 118 may also include a current copy of requirement object 116A.

According to the techniques for identifying suspect links described herein, relationship logic 118 may be further operable (either by itself or in conjunction with another component of RM server 112) to identify as suspect links included in relationship information 130. As an operational example, suppose that relationship logic 118 receives input indicating that requirement object 116A was changed. In response to the input, relationship logic 118 automatically determines which links in relationship information 130 associate requirement object 116A with any CM objects and then identifies any identified links as suspect. For example, relationship logic 118 may search links 137 and may determine that links 132A, 132B, and 132C associate requirement object 116A with CM objects 126A, 126B, and 126C, respectively. Having identified links 132A, 132B, and 132C, relationship logic 118 may then store in each of these links data which indicates that each link is suspect.

According to the techniques for identifying suspect links described herein, relationship logic 128 in CM server 122 may also be operable to identify as suspect links included in relationship information 130. As an operational example, suppose that relationship logic 128 receives input indicating that CM object 126B was changed. In response to the input, relationship logic 128 automatically determines which links in relationship information 130 associate CM object 126B with any requirement objects and then identifies any identified links as suspect. For example, relationship logic 128 may search links 137 and may determine that at least link 132B associates CM object 126B with requirement object 116A. Having identified link 132B, relationship logic 128 may then store in the link data which indicates that the link is suspect.

For illustration purposes only, the techniques provided herein are described with respect to FIG. 1A as being performed by certain components of RM system 110 and CM system 120. However, it is noted that the techniques described herein are not limited to being implemented by any particular software components in any particular software systems. Rather, the techniques described herein may be implemented by any suitable software components and systems that are operable to perform the functionalities described herein. Examples of such software components and systems include, without limitation, standalone applications, integrated software tools, and various plug-in modules. In addition, the operational context illustrated in FIG. 1A may include other implementation-dependant components and elements that are not depicted in FIG. 1A in order to avoid unnecessarily obscuring the techniques described herein. Thus, the operational context illustrated in FIG. 1A and the specific details thereof are to be regarded in an illustrative rather than a restrictive sense.

III. Requirement Objects

According to the techniques described herein, a requirement is an official, binding description or specification of a characteristic or feature that a software product needs to have and/or plans to achieve. Various characteristics and features may be specified in a requirement; the techniques described herein are not limited to any particular types of product characteristics or features.

A requirement object is a set of data that specifies or defines a requirement for a software product. Requirement objects are managed by RM systems or applications. In various embodiments, the requirement objects managed by a RM system may be organized in collections, where a requirement object collection may be associated with one or more software products.

The requirements for a software product may change over time during the lifecycle of the product. In some embodiments, a RM system may provide software components for managing changes made to requirement objects and the requirements stored therein. Managing requirement changes may involve preventing unauthorized changes, gathering the information necessary to make informed decisions about which changes to allow, and making those changes in a systematic way.

In some embodiments, relationships may be defined between requirement objects, and it is possible for changes in one requirement object to affect other requirement objects. The ability to determine the effect of a change in a requirement object on other requirement objects is an important functionality of a RM system. For example, suppose a requirement object stores a marketing requirement which specifies that all user interfaces (UIs) must include a blue logo. From this marketing requirement, there may be several linked sub-requirements which state that the desktop UI, the Web client, and a plug-in all must include the blue logo. If the marketing manager changes her mind and decides that the software product should instead include a red logo, then all of the sub-requirements linked to the marketing requirement would become invalid. By storing relationship information that defines the relationships between requirements, the techniques described herein would allow the marketing manager to determine what effect the change to the red logo would have on other requirements for the software product prior to actually making the change.

In addition to the specification or definition of a requirement, in various embodiments a requirement object may store one or more attributes associated with the requirement specified in that object. The attributes associated with the requirement may be user-specified or may be provided by the RM system that manages the requirement objects. Examples of requirement attributes include, without limitation, a requirement ID, a requirement type or category, a requirement text, a user ID of the user that created the requirement, a user ID of the user that last modified the requirement, and date and time the requirement was created, stored, and/or last modified. Depending on the implementation of a data repository that stores the requirements for a software product, a requirement object may use various data structures to store the requirement attributes. For example, in embodiments that store requirements in a relational database, a requirement object may be stored as one or more records and the requirement attributes may be stored as one or more fields in the one or more records.

In some embodiments, a requirement object may specify one or more content characteristics of a software product. For example, a requirement may specify the following content characteristic of the software product: "Each Graphical User Interface (GUI) of the product must include a blue logo in the top right corner."

In some embodiments, a requirement object may specify one or more functional characteristics of a software product. For example, a requirement may specify the following functional characteristic of the software product: "The product must provide a GUI operable to receive a stock ticker from the user, and must return to the user the current stock price associated with the received ticker." This functional requirement may include the following one or more sub-requirements: "After receiving a ticker from the user, a determination must be made whether the received ticker is a valid," and "If the ticker is not valid, an error message must be displayed to the user."

In some embodiments, a requirement object may specify one or more design characteristics of a software product. For example, a requirement may specify the following design characteristic of the software product: "A function for computing a P/E ratio of a given stock must be included in library X."

In some embodiments, a requirement object may specify one or more marketing characteristics of a software product. For example, a requirement may specify the following marketing characteristic of the software product: "Each GUI of the product must include a hypertext link to the web site of company X."

In some embodiments, a requirement object may specify one or more customer-specified characteristics of a software product. For example, a requirement may specify the following customer-requested characteristic of the software product: "Users must be able to chose the language they want to work in. The default is U.S. English."

In some embodiments, a requirement object may specify one or more security characteristics of a software product. For example, a requirement may specify the following security characteristics of the software product: "Individual users must have separate accounts to which access permissions can be assigned," and "Accounts of individual users may be associated with group accounts to which access permissions can be assigned."

In some embodiments, a requirement object may specify one or more hardware characteristics of a software product. For example, a requirement may specify the following hardware characteristic of the software product: "The software product must be able to execute on a hardware platform with a minimum of 512 MB of RAM."

In some embodiments, a requirement object may specify one or more test-case characteristics of a software product. For example, a requirement may specify the following test-case characteristic of the software product: "The function computing a P/E ratio for a given stock must be tested with data set X, which is stored in location Y."

The list of requirement object types provided in this section is not exhaustive, and various embodiments of the techniques described herein may use many other types of requirement objects. In general, the various types of requirement objects that may be used in a specific embodiment depend at least in part on the type of software product that is being developed. It is also noted that for purely illustrative purposes the examples of requirement object types provided herein specify relatively simple requirements. However, various embodiments of the techniques described herein may use requirement objects that specify arbitrarily complex requirements that may range, for example, from very high-level requirements defining general characteristics of a software product (e.g., the software product must run on a UNIX Operating System) to very specific and detailed requirements that pertain to very specific portions of the software product (e.g., a specific GUI must have a dialog control with three buttons.) Thus, the examples of requirements and requirement object types provided herein are to be regarded in an illustrative rather than a restrictive sense.

IV. Configuration Management (CM) Objects

According to the techniques described herein, a CM object is a set of data that may be used in the development of a software product. For example, a CM object may comprise a source code file and metadata information about the source code file. In another example, a CM object may comprise metadata information about a software project that implements the software product. Depending on the implementation of a data repository that stores the set of CM objects used in the development of a software product, a CM object may use various data structures to store the object data.

In some embodiments, a CM object may store its set of data in multiple data repositories. For example, a CM object comprising a source code file and metadata information associated therewith may store the source code file in a file directory and the metadata information as a record or records in a relational database that is managed by a CM system. The metadata information may comprise one or more attributes of the source code file including, without limitation, a file name, a version, and a network path to and a directory name of the directory where the source code file is stored. In these embodiments, the CM system may use the metadata information stored in the relational database to control and manage check-ins and check-outs of the source code file, while actual modifications of the source code file and different version copies thereof would be stored in the file directory.

In various embodiments, the techniques described herein may use various types of CM objects including, but not limited to, item objects, change request objects, and development task objects. In general, the various types of CM objects that may be used in a specific embodiment depend at least in part on the type of software product that is being developed.

An item CM object comprises a file and metadata information associated with that file. In a project that implements a software product, item CM objects may comprise various files including, but not limited to, source code files, object code files, and executable files. For example, an item CM object may comprise a file that stores source code and metadata information associated with that source code file. The metadata information associated with a source code file may include any user-defined attributes for the file including, but not limited to, a type of encoding used on the file, identifiers of one or more projects to which the file is attached, an identifier of the current owner of the file, date and time at which the file was created, last accessed, and/or last updated, the version of the file, and a status reflecting the development lifecycle of the file. (The status reflecting the development lifecycle of the file may indicate that the file is created, reviewed, approved, tested, etc.) In addition, the metadata information associated with a source code file may include attributes that are defined by the CM system that manages the item CM object; examples of such attributes include, without limitation, a file name, a CM version of the file, a network location where a copy of the version of that file is stored, and permissions data which indicates which users may check-in and check-out the file.

A change request CM object comprises an issue and metadata information associated with that issue. As used herein, "issue" refers to information that specifies a characteristic or feature of a software product that may be causing a problem or that may otherwise need to be changed. The metadata information included in a change request CM object may include, without limitation, information indicating the creator of the issue, date and time the issue was determined and/or reported, a status of the issue, a list of item CM objects that may be associated with the issue, and permission data which indicates which users may manage the issue. In addition, the metadata information included in a change request CM object may also comprise developer-attached tags indicating comments regarding problems and other issues that are encountered during the process of resolving the issue. The metadata information included in a change request CM object may also comprise information indicating the relationships between the change request CM object and any other item CM objects and/or other change request CM objects.

A development task CM object comprises metadata information that specifies one or more development tasks or actions that need to be performed in a project that implements a software product. The metadata information may specify a user ID of a manager that is responsible for assigning the one or more development tasks to a developer, and user ID of a developer that is assigned to perform the one or more development tasks. The metadata information may also specify one or more item CM objects and/or change request CM objects that may be involved in the one or more development tasks, as well as any relationships that may exist between the specified item CM objects and/or change request CM objects. In addition, the metadata information included in a development task CM object may include, without limitation, information indicating the creator of the development task CM object, date and time the development task CM object was created, last accessed, and/or last updated, a status of the development task CM object, and any other user-defined or system-defined attributes.

The list of CM object types provided in this section is not exhaustive, and various embodiments of the techniques described herein may use many other types of CM objects. Thus, the examples of CM object types provided in this section are to be regarded in an illustrative rather than a restrictive sense.

V. Baselines Across Multiple Domains

FIG. 2 is a flow diagram that illustrates an example method for baselining across multiple software development domains according to the techniques described herein.

In step 202, relationship information is stored. The relationship information associates a collection of requirement objects with a set of CM objects. The collection of requirement objects is defined in RM system for a software product, and the set of CM objects is defined in a CM system operable to manage the development of the software product.

In various embodiments, the relationship information may be stored in a data repository by either one or both of the RM system and the CM system. For example, the RM or CM system operable to store the relationship information may receive input that identifies a requirement object in the RM system and input that identifies one or more CM objects in the CM system. Based on the received inputs, one or more links may be stored as part of the relationship information, where the one or more links respectively identify the one or more CM objects in association with the requirement object.

In step 204, a particular requirement object is determined from the collection of requirement objects. For example, in some embodiments the particular requirement object may be identified by determining that a change was made to that requirement object.

In step 206, one or more CM objects that are associated with the particular requirement object may be determined based on the stored relationship information. For example, in some embodiments the stored relationship information may be inspected to determine which CM objects are associated with the particular requirement object. In this manner, the relationship information may be used to find those one or more CM objects that are associated with the particular requirement object and that may be affected by any changes made to that requirement object.

In step 208, a baseline is created and stored. The baseline includes copies of the determined one or more CM objects, where the copies include and/or reflect specific versions of the one or more CM objects. In some embodiments, the baseline may also include a copy of the determined particular requirement object, where the copy may include and/or reflect a specific version of that requirement object. When included in the generated baseline, the copies of the one or more CM objects and the copy of the particular requirement object (if stored in the baseline) are not subject to changes and would always reflect the specific object versions that were selected for including in the baseline.

In some embodiments, relationship information that associates the particular requirement object and the one or more CM objects may also be included in the baseline. For example, in embodiments in which the relationship information comprises a plurality of links, copies of the one or more links which associate the particular requirement object with the one or more CM objects may be also be stored in the baseline; thus, the copies of the one or more links stored in the baseline are not subject to changes or deletions and would always reflect a specific version or state of the relationship information.

In some embodiments, a user can provide information that selects requirements and/or requirement objects and associates them with CM objects in order to revise a previously created baseline. According to the techniques described herein, in these embodiments a new baseline may be generated that includes the newly selected requirement objects and CM objects. The new baseline may be indicated as a new, versioned copy of the previously created baseline.

The techniques for baselining across multiple domains described herein ensure that the requirements for a software product can be baselined along with the CM objects that they affect. Since the requirements for a software product are almost never static, the techniques described herein ensure that dynamically changing requirements can be kept in synch with the development of the software product. The ability to associate objects from the RM and CM domains creates a complete configuration set for a project that implements a software product and preserves the state of the business value proposition for the product at the particular point or points in time at which the baseline was created.

The techniques described herein also allow users to have insight to how various types of seemingly unrelated objects from multiple domains are associated with each other. For example, some embodiments may allow a user to view all requirements associated with and/or stored in a baseline while the user is generating a build of a software project in a CM system.

Baselining Based on Requirement Changes

According to the technique described herein for baselining across multiple domains, the relationship information being stored effectively maps a collection of requirement objects to a set of development task CM objects. Thus, in some embodiments any change to a requirement in a requirement object may be tracked to and associated with some changes that would need to be (or have been) performed in the set of CM objects. Based on the relationship information, in these embodiments a baseline may be generated to reflect the change to the requirement. The generated baseline may include copies of only those CM objects that have been modified to implement the requirement change.

In some embodiments, adding a new product requirement to an already existing collection of requirements may also cause the generation of a baseline. For example, suppose that a business manager decides to include a new requirement to the requirements already specified for a project that implements a software product. According to the technique described herein for baselining across multiple domains, relationship information is stored which associates a requirement object that includes the new requirement with one or more CM objects that include source code files which implement the new requirement. Thereafter, according to the techniques described herein a new baseline may be generated. The new baseline may comprise all requirement objects that store the requirements for the software product, including the requirement object that stores the new requirement, as well as at least the CM objects that are used to implement the new requirement.

In a similar manner, a deletion of a particular requirement from the requirements specified for a software product may cause the generation of a baseline that includes all requirement objects that store the requirements for the software product, excluding any requirement objects that store the deleted requirement, as well as the CM objects that are used to implement the current requirements for the software product.

Thus, according the techniques described herein for baselining across multiple domains, the content of the baseline may be driven by changes, additions, or deletions of the requirements for a software product. In addition, any later review of the product requirements would be able to determine from a generated baseline exactly which CM objects (and/or files thereof) have been changed, added, or deleted in order to implement any changes, additions, or deletions to the product requirements.

Associating Sub-Requirements with CM Objects

In some embodiments, a major product requirement managed by a RM system may be specified as having multiple sub-requirements. For example, the major product requirement may be specified in a top-level requirement object and the multiple sub-requirements may be specified in multiple sub-requirement objects that are defined as children of the top-level requirement object. The top-level requirement object and the multiple sub-requirement objects may be organized in any suitable data structure such as, for example, a tree, one or more tables, or any type of other data structure that can preserve the relationships between the major product requirement and the multiple sub-requirements.

According to the techniques described herein, in these embodiments each of the sub-requirement objects may be separately associated with one or more CM objects. For example, one or more links may be stored that associate each of the sub-requirements with one or more separate development task CM objects. This allows for the process of generating a baseline to be driven completely from the top-level requirement and the multiple sub-requirements thereof. In addition, this allows the generation of accurate and fine-grained baselines that can provide detailed information about which sub-requirements are implemented by performing which development tasks, which in turn allows for better management of development resources such as, for example, assigning development tasks to developers and accurately estimating the time necessary to complete the development tasks.

Criteria-Based Selection of CM Objects

The techniques described herein allow for various criteria to be used in determining which CM objects are included in a baseline.

For example, in some embodiments the CM objects that are to be included in a baseline may be selected as those CM objects that are associated with a particular requirement object. When a baseline is generated, the latest (or the most current and up-to-date) versions of the selected CM objects may be included in the baseline.

In some embodiments, the criteria for selecting CM objects for inclusion in a baseline may be the maturity level of a particular CM object with respect to the development lifecycle of the object. For example, only CM objects that have passed supervisor review may be selected for inclusion in the baseline.

In general, the techniques described herein allow CM objects to be selected for inclusion in a baseline by comparing attribute information of the CM objects with any user-specified or system-defined criteria. In this manner, the techniques described herein allow for better flexibility and more accuracy in the process of baseline generation.

Excluding Requirement Objects and CM Objects from Baselines

Based on relationship information that associates requirement objects and CM objects, the techniques described herein allow not only for including but also for excluding requirement objects and CM objects from baselines.

In some embodiments, a user may be allowed to provide information which indicated that a specific requirement object or a CM object needs to be excluded when a baseline is generated. For example, at time T1 a business manager may decide to generate a baseline that includes the requirement objects specifying requirements R1, R2, and R3, as well as the associated CM objects that implement these requirements. Thereafter, at time T2 the business manager may decide to generate a baseline that includes the requirement objects that specify, and the associated CM objects that implement, requirements R1 and R3 only, thus excluding the requirement and CM objects for requirement R2. (Requirement R2 may need to be excluded for a variety of reasons such as, for example, because requirement R2 was not implemented properly or because the product feature indicated in requirement R2 is no longer need in the product). In this manner, the ability to exclude requirement objects and CM objects from baselines provides granularity to the process of generating baselines.

By providing the ability to exclude requirement objects and CM objects from baselines, the techniques described herein allow a software company to generate and ship custom-build versions of software products, where a particular custom-build version of a software product may include features specified by a particular customer and may be priced for that particular customer. Since the process of excluding requirement objects and CM objects from baselines is based on relationship information that associates the requirement objects and the CM objects, generating and shipping a custom-build version of a software product to a particular customer may be efficiently performed at the business level (e.g., by a sales or business manager) without any involvement by software engineers.

Impact Analysis Based on Relationship Information

Based on relationship information that associates requirement objects and CM objects, the techniques described herein allow for providing users with information which indicates what impact a requirement change would have on the development of a software product.

Some embodiments may provide a software component that is operable to receive user input identifying a particular requirement managed by a RM system, and to return to the user impact analysis information which indicates which CM objects would be affected by a change to the identified requirement. For example, the software component may be operable to search stored relationship information that associates a collection of requirement objects for a software product with a set of CM objects that are used to develop the software product, where the search would return which CM objects are associated with a requirement object that includes a user-specified requirement. Since the software component operates by searching the relationship information, the software component may be implemented in a RM system, in a CM system, and/or in any other system that has access to the relationship information.

By providing impact analysis information, the techniques described herein allow business managers to accurately estimate the time necessary to implement software product requirements and/or changes thereto, which in turns provides for more efficient allocation of software development resources.

VI. Suspect Links

Figure 3:
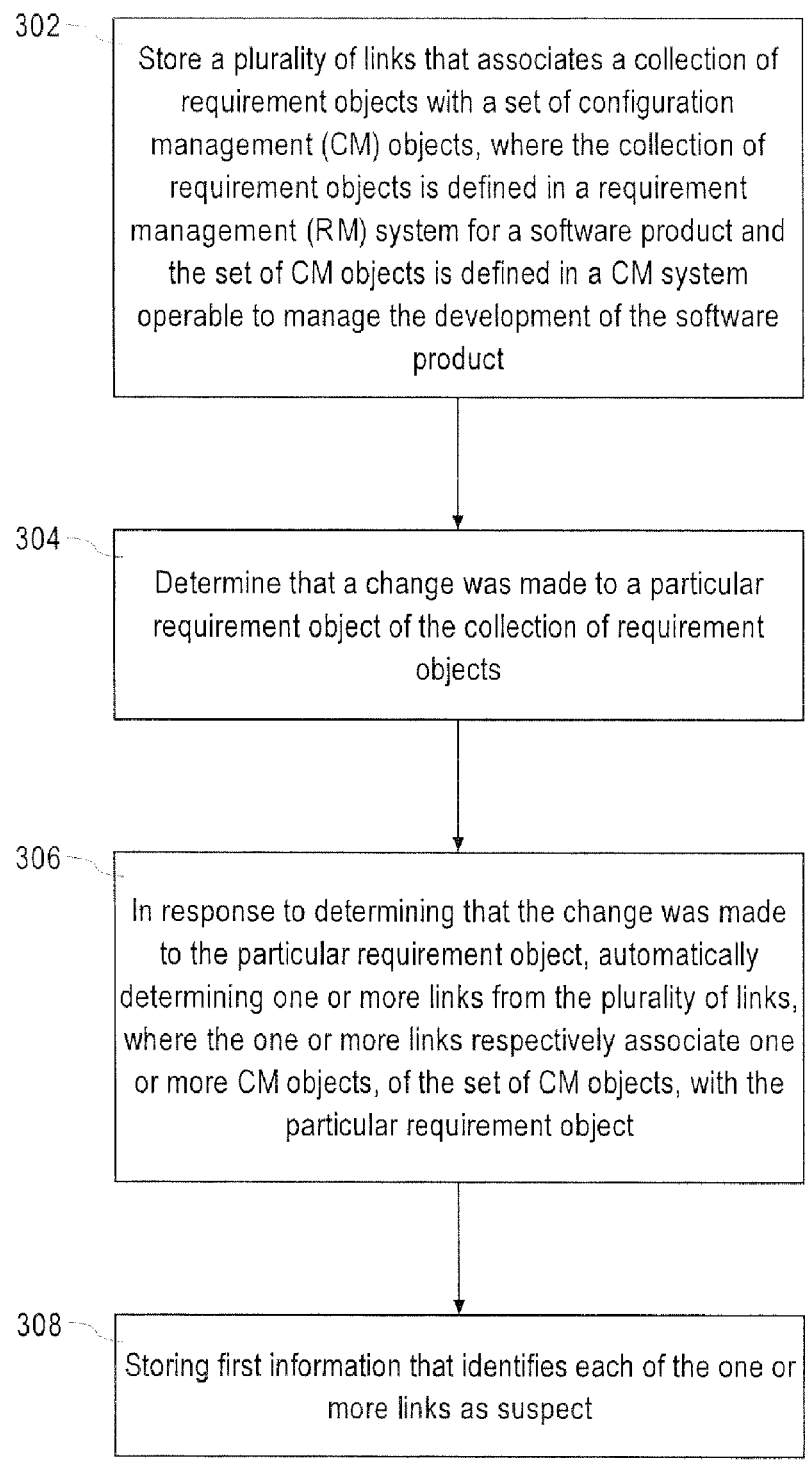
FIG. 3 is a flow diagram that illustrates a method for identifying suspect links according to an example embodiment.

FIG. 3 is a flow diagram that illustrates an example method for identifying suspect links according to the techniques described herein.

In step 302, a plurality of links is stored. The plurality of links associates a collection of requirement objects with a set of CM objects. The collection of requirement objects is defined in a RM system for a software product, and the set of CM objects is defined in a CM system operable to manage the development of the software product.

In various embodiments, each link of the plurality of links may be implemented as a data structure that stores data indicating an association between one or more requirement objects and one or more CM objects. The plurality of links may be stored in a data repository by either one or both of an RM system and an CM system. For example, the RM and/or CM system operable to store the plurality of links may receive input that identifies a requirement object in the RM system and input that identifies one or more CM objects in the CM system. Based on the received inputs, one or more links may be stored which respectively identify the one or more CM objects in association with the requirement object.

In step 304, it is determined that a change was made to a particular requirement object of the collection of requirement objects. For example, a RM system may receive input which indicates that a requirement is modified by a user. Based on the received input, the RM system or a component thereof may automatically determine the particular requirement object that specifies and stores the modified requirement.

In step 306, one or more links are automatically determined from the plurality of links in response to determining that the change was made to the particular requirement object. For example, the stored plurality of links may be inspected to determine which links store information identifying the particular requirement object. The automatically determined one or more links are those links which include information that identifies the particular requirement object and associates the particular requirement object with at least one CM object. In this manner, the plurality of links and the information stored therein may be used to find those one or more links which identify CM objects that are associated with the particular requirement object and that may be affected by any changes made to that requirement object.

In step 308, the one or more automatically determined links are identified as suspect. Identifying (or marking) the one or more links as suspect may be performed by storing specific, pre-determined information in each link. For example, each link may include a field that is operable to store data which indicates whether or not that link is identified as suspect. In some embodiments, the field included in the link may be a flag operable to store a Boolean value; thus, in these embodiments a value of "TRUE" stored in the field may indicate that the link is suspect and a value of "FALSE" may indicate that the link is not suspect. In other embodiments, the filed included in the link may be operable to store a value of a datatype other than the Boolean datatype; in these embodiments, each value that can be stored in the field may be coded to represent a particular status of the link where the link status may include the "suspect" and "not suspect" statuses. It is noted that the techniques described herein are not limited to any particular mechanism for indicating whether or not a link is suspect; rather, any suitable mechanism may be used and for this reason the examples provided herein for indicating whether or not a link is suspect are to be regarded in an illustrative rather than a restrictive sense.

After the plurality of links which associates requirement objects with CM objects is stored, by automatically identifying links as suspect the techniques described herein provide for automatically and proactively tracking which objects may be affected by changes to other objects. It is important to know whether a change in one requirement has possibly rendered other requirement objects and/or CM objects questionable, or suspect. This capability is important for business managers that work in a team or in a collaborative environment because a business manager making a change to a specific requirement may not be responsible for any other requirements that may be affected by the change to the specific requirement. The capability to identify suspect links provided by the techniques described herein allow users to determine which related requirements could potentially be affected, and which ones would not be affected, when a change is made to any requirement.

Traditionally, the capability to identify suspect links may be implemented in a RM domain, but is not implemented or used in any CM domains. However, the techniques described herein extend the capability to identify suspect links to domains other than the RM domain such as, for example, CM domains, Issue Management domains, and other software development domains. In this manner, the techniques described herein allow for proactive notification of users about any downstream effects of requirement changes to other requirements as well as for proactive notification of user about any downstream effects to non-requirement objects such as CM objects, issue objects, and any other types of software development objects that may be affected.

According to the techniques described herein, actions that may trigger identifying links as suspect include, without limitation, updating a requirement object, updating a CM object, replacing a requirement object, replacing a CM object, and accepting or entering a change request CM object. By automatically identifying links as suspect, the techniques described herein provide an efficient mechanism for automatically determining which requirement objects and/or CM objects could potentially be affected by the change in another requirement and/or CM object.

The capability to identify suspect links provided by the techniques described herein allows users to take action in response to changes in requirement objects and/or CM objects. For example, in response to being notified of a suspect link, a user can manually determine whether a CM object identified in the suspect link would actually need to be changed in response to a change in the requirement object identified in the suspect link. In this manner, the suspect links may be used to inform users that they need to do their due diligence for suspected objects in response to a requirement change.

In some embodiments, links may identify CM objects that specify source code files. In other embodiments, links may identify CM objects that specify information that is more particular and detailed than entire files. For example, a link may identify a CM object that specifies a block of source code within a source code file such as, for example, a particular function, a particular class, or a particular method of a class. In this manner, the techniques described herein allow for improved granularity and specificity with regards to what types of entities may be affected, and marked as suspect in the associated links, in response to a requirement change.

Providing Impact Analysis Information to Users

The techniques described herein for identifying suspect links provide for communicating to users impact analysis information that indicates any identified suspect links and/or any objects that may be associated through the identified links. In various embodiments, the impact analysis information may be provided to a user in any suitable form and/or format such as, for example, as a graphical object in a GUI (e.g., a list, table, hierarchical tree), as a text file, as an email, and/or as an instant message. The techniques described herein are not limited to any particular form or format in which impact analysis information may be presented to a user, and any suitable forms and formats may be used.

In some embodiments, the techniques described herein provide for communicating to users impact analysis information about the potential impact which may result from changes to objects that are associated through links, even if the associated objects are managed in separate domains. For example, based on a stored plurality of links, the associations between requirement objects and CM objects can be tracked and traced. Extending the capability to identify suspect links, as provided by the techniques described herein, from requirement objects to CM objects allows for proactive notification to developers to look at particular source code files or design documents when a certain related requirement changes.

In this manner, the techniques described herein provide users with impact analysis information which the users may use to determine how changes to requirements affect the source code implementing these requirements. This in effect gives the users the ability to evaluate and verify the downstream effects of changes to requirements. By evaluating the downstream effects of changes to requirements, the users may gain valuable "visibility" into the overall development of a software product that could not be gained by using the traditional approaches to software development, which cannot not efficiently provide information from multiple software development domains.

Clearing Out Suspect Links

In some embodiments a system (e.g., a RM system or a CM system), which maintains a plurality of links that associate requirement objects with CM objects, may be operable to search for links identified as suspect and may present any such suspect links to a user. In some implementations, the system may perform the search for suspect links in response to a change that a user makes to a requirement. In other implementations, the system may provide a software component that is operable to search for suspect links independently and without any input indicating requirement changes.

After identifying links that are identified as suspect, the system may automatically present these suspect links to a user in a list, a visual graph, a table, or any other suitable GUI or text-based mechanism. After receiving information that identifies the suspect links, the user may investigate further to determine whether any CM objects identified in the suspect links are actually going to be affected by any requirement changes. Thereafter, the user may update the requirement(s) that caused the links to be identified as suspect or may clear the "suspect" status of the identified links.

For example, the user may provide to the system input which indicates which CM objects identified in the suspect links are not affected by changes in the requirement object or objects identified in the suspect links. In response to the user input, the system may automatically unmark (or un-identify) as suspect those links which identify the CM objects indicated in the user input. Unmarking (or un-identifying) the links as suspect may include storing a specific data value in the links, or may include removing any data values that indicate a "suspect" status. In some embodiments, only users with sufficient privileges may be allowed to clear suspect links.

Marking Links as Suspect From a CM System

In some embodiments, the techniques described herein for identifying suspect links allow for identifying links as suspect in response to changes in CM objects.

For example, during the development of a project that implements a software product, a developer may need to change a source code file for reasons that are not caused by a requirement change. (Such reasons may include, for example, fixing a bug, fixing a security flaw, and changing source code to optimize performance.) Typically, the developer would check-out the source code file in a CM system, would make the change, and would then check-in the file in the CM system, where the check-in of the file would cause a change to the CM object that includes that file. According to the techniques described herein, in response to the change in the CM object, the CM system would automatically determine all links that identify the changed CM object in association with any requirement objects. Then, the CM system would automatically identify all these links as suspect.

Thereafter, a user may be automatically provided with information identifying the links which have been marked as suspect in response to changes in CM objects. The user may use this information in order to investigate and determine whether the changes to the CM objects violate or go against the requirements associated therewith. In this manner, the techniques described herein provide a bi-directional capability for tracking suspect links in response to changes that may be made to either or both of requirement objects and CM objects.

VII. Traceability

As used herein, "traceability" refers to a capability that allows users to evaluate the effects of changes to objects and to identify potential problems. The traceability capability provided by the techniques described herein is based on relationship information and links between requirement objects and other data entities. The techniques described herein also provide for generating traceability reports that show requirement objects and links to associated CM objects, thus allowing users to determine how changes to the requirement objects affected and caused changes to the associated CM objects. The traceability reports may be presented to users in a GUI-based and/or text-based form.

In some embodiments, traceability is implemented by making copies of the relationship information that associates requirement objects and CM objects. For example, if the relationship information comprises links that are stored as records in a relational database, then traceability may be implemented by storing audit trail information comprising copies of the records each time the records are changed. Since the links represent instances of relationships between certain versions of requirement objects and certain versions of CM objects, the audit trail information and the copies of the links stored therein provide a complete version trail for all changes made to both of the requirement objects and CM objects. By inspecting the historical copies of the links, a system maintaining the links (e.g., a RM system and/or a CM system) may use the audit trail information to automatically generate a traceability report that can be presented to a user.

In some embodiments, the traceability capability described herein allows for performing an efficient impact analysis. According to the techniques described herein, links define precisely which objects are related and why they are related. The links which associate objects may be set up based on user-provided information and/or based on information that is automatically imported from outside documents. Different kinds of traceability may result from different kinds of links. For example, links defined between requirement objects may be used to trace requirement dependencies such as the dependencies between hardware requirements and software requirements. In another example, links defined between requirement objects and CM objects may be used to trace how changes to requirements would impact source code files represented by the associated CM objects.

In some embodiments, the traceability capability described herein allows for performing impact analysis. The impact of a change to a requirement object or a CM object may be determined prior to actually making the change by analyzing the relationship information that associates requirement objects and CM objects. For example, a user may examine a particular requirement and may determine, based on the stored relationship information, that the particular requirement only applies to one or two source code modules. Thus, the user would find out that the particular requirement may be changed slightly without having to do much rework on the source code. However, if the user determines that 100 source code modules are associated with the particular requirement, then user would realize that the particular requirement defines a core feature of the product so changing this requirement may have a bigger impact.

In some embodiments, the traceability capability described herein may be used for links that represent the associations between different versions of the same requirement or CM object. This allows for tracing the history of the object as well as the evolution of the object through a project's lifecycle.

In some embodiments, audit trail information generated by the traceability capability may be used in conjunction with the techniques described herein for baselining across multiple domains in order to determine what exactly has been captured in a specific baseline. For example, the audit trail information generated by the traceability capability may be passed to a Quality Assurance (QA) team, and the QA team would be able to determine exactly what changes in the source code of a software product were made in response to which requirements. This provides the ability for effective software development and testing, and for more "visibility" into what a particular version of the software product includes—e.g., when a product release goes to a QA team or to a customer, the QA team or the customer would know exactly which features are included in that release of the product.

In some embodiments, the traceability capability described herein allows for tracking and tracing suspect links. For example, suppose that a plurality of links associates requirement objects managed by a RM system with CM objects managed by a CM system, and that traceability is implemented by making copies of the links each time the links are changed. By using audit trail information generated according to traceability capability described herein, any links that are identified as suspect by the RM system may be traced all the way down to specific versions of the source code files represented by the CM objects. This allows for an efficient way to determine the completeness and consistency of the requirement objects and CM objects that are involved in a project that implements a software product. For example, based on audit trail information that tracks suspect links, information may be provided to a user that indicates exactly which changes to requirement objects are still outstanding and have not yet been implemented in the associated CM objects.

In the above manner, the traceability capability described herein allows for efficient troubleshooting and determination of the historical changes that were made to the requirements and the source code of a particular software product. In addition, the traceability capability described herein improves the "visibility" into the overall development of a software product which empowers users involved in the development, such as developers and business managers, to make accurate decisions.

VIII. Additional Features and Alternative Embodiments

Even though the techniques for baselining across multiple domains and the techniques for identifying suspect links have been described herein with respect to the RM and CM domains, these techniques are not so limited.

For example, the techniques for baselining described herein may be used for objects managed in more than two domains and in domains other than the RM and CM domains. For example, the techniques for baselining may be used for objects managed by systems that include, but are not limited to, Human Resources (HR) systems, financial systems, content management systems, and customer service systems.

In addition, the techniques for baselining described herein are not limited to any particular hardware or software platforms or to systems provided by any particular vendor; rather the techniques for baselining described herein may be implemented on any suitable hardware and software platforms and systems. For example, in some embodiments PeopleSoft objects could be included in a CM baseline to track the people involved in the process of managing CM objects and data. Thus, in these embodiments a baseline may include CM objects, requirement objects, test cases from an automated testing application, and PeopleSoft HR objects, thereby including objects that span four separate domains.

Similarly, the techniques for identifying suspect links described herein may be extended across more than two domains and to domains other than the RM and CM domains. For example, the techniques for identifying suspect links described herein may be used for links that associate objects from various systems including, but not limited to, Issue Management systems, project portfolio management (PPM) systems, HR systems, financial systems, content management systems, and customer service systems. Such links may be used in accordance with the techniques for identifying suspect links in order to proactively communicate changes that may affect various users who use various objects across various domains. In this context, crossing domains and systems that manage objects thereof means crossing one or more application, conceptual, or platform boundaries to identify suspect links to related objects when a change is made to a first object.

In addition, the techniques for identifying suspect links described herein are not limited to having changes to requirement objects as the sole reason for identifying links between objects as suspect. For example, using the techniques described herein, it may be possible to identify suspect links between change requests and source files in a CM system and personnel files in an HR system, such as an SAP system. Further, when applied in an environment which supports web services and the like, suspect links can be identified for objects in third party applications that link with an RM system or another type of application. For example, a change to a requirement in a RM system may cause the marking as suspect a link that associates the requirement object storing that requirement with a test script that is stored in a separate third party testing tool.

In some embodiments, the techniques for identifying suspect links described herein may be applied outside of managing changes to requirements. For example, source code files may be associated, through one or more links, to a particular owner who is leaving the company. The departure of the owner from the company would be reflected in a HR system, such as SAP or PeopleSoft, by changing an HR object that represents the departed owner. In this context, according to the techniques for identifying suspect links described herein, the change to the HR object would cause the one or more links associating the source code files with the departed owner to be identified as suspect.

IX. Implementation Mechanisms

Figure 4:
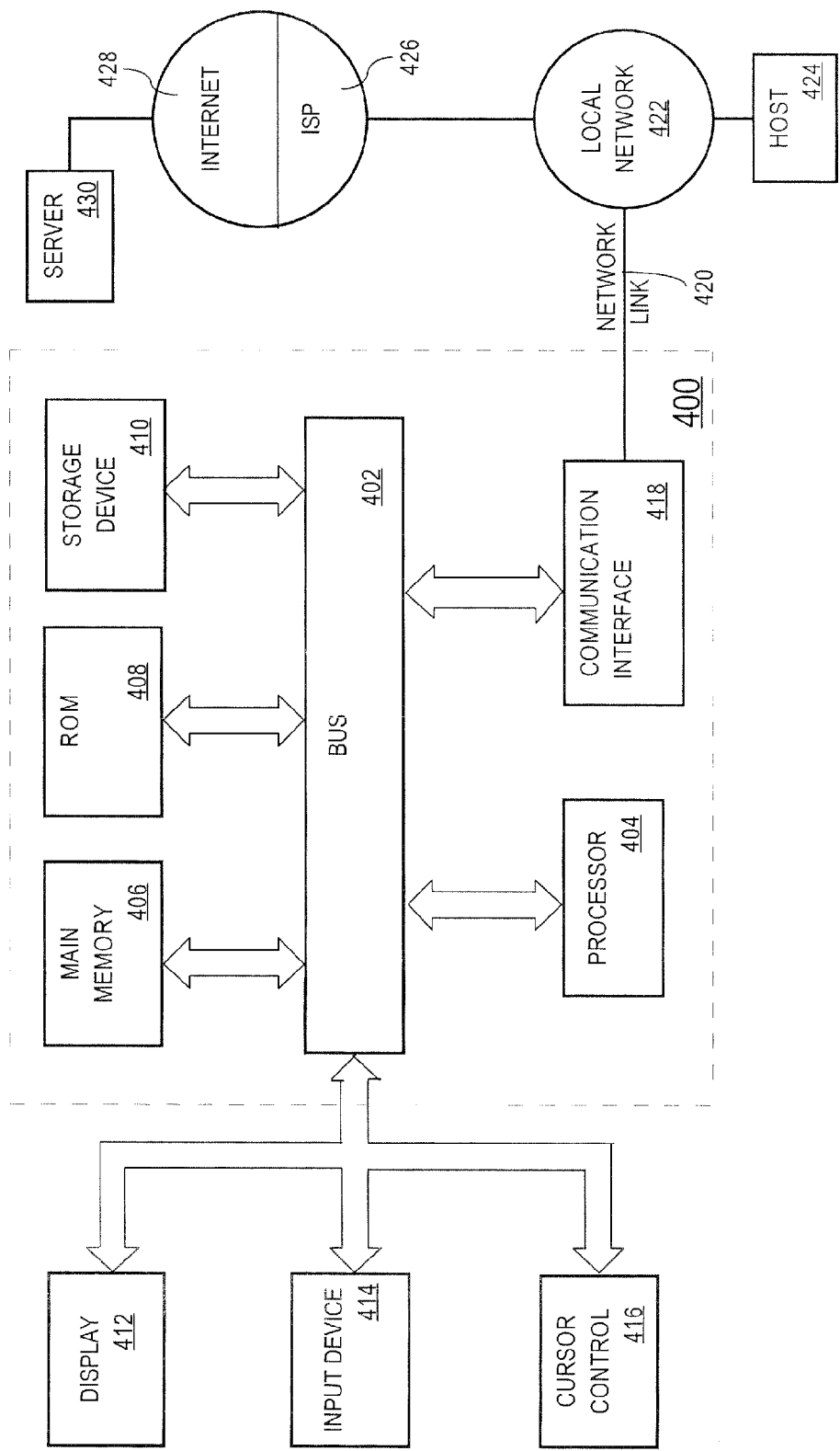
FIG. 4 is a block diagram that illustrates an example computer system on which embodiments may be implemented.

Depending upon a particular implementation, the techniques described herein may be implemented in any context and on any kind of computing platform or architecture, and are not limited to any particular context, computing platform, or architecture. For purposes of explanation, FIG. 4 is a block diagram that illustrates an example computer system 400 upon which embodiments of the techniques described herein may be implemented.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein for baselining across multiple domains and for identifying suspect links. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   storing relationship information that associates a collection of requirement objects with a set of configuration management objects;
   wherein the collection of requirement objects is defined in a requirement management system for a software product;
   wherein the set of configuration management objects is defined in a configuration management system that is operable to manage the development of the software product;
   determining, based on the relationship information, one or more configuration management objects, from the set of configuration management objects, that are associated with a particular requirement object; and
   creating and storing a baseline that includes copies of the one or more configuration management objects, wherein the copies of the one or more configuration management objects include specific versions of the one or more configuration management objects.

2. The computer-implemented method as recited in claim 1, wherein creating and storing the baseline further comprises including a copy of the particular requirement object into the baseline, wherein the copy of the particular requirement object includes a specific version of the particular requirement object.

3. The computer-implemented method as recited in claim 2, further comprising storing audit trail information, wherein the audit trail information associates the baseline with the specific version of the particular requirement object.

4. The computer-implemented method as recited in claim 1, wherein:
   each requirement object in the collection of requirement objects is a set of data that specifies one or more intended characteristics of the software product; and
   each configuration management object of the set of configuration management objects is used in the development of the software product.

5. The computer-implemented method as recited in claim 1, further comprising:
   determining that a change has been made to the particular requirement object; and
   determining the one or more configuration management objects further comprises:
      inspecting the relationship information to determine which configuration management objects, from the set of configuration management objects, are affected by the change made to the particular requirement object; and
      determining that the one or more configuration management objects are those configuration management objects, from the set of configuration management objects, that are affected by the change made to the particular requirement object.

6. The computer-implemented method as recited in claim 1, wherein storing the relationship information further comprises:
   receiving first input that identifies the particular requirement object in the collection of requirement objects;
   receiving second input that identifies the one or more configuration management objects in the set of configuration management objects; and
   storing one or more links as at least part of the relationship information based on the first input and the second input, wherein the one or more links respectively identify the one or more configuration management objects in association with the particular requirement object.

7. The computer-implemented method as recited in claim 1, wherein the particular requirement object is one or more of:
   a functional requirement object that specifies one or more functional characteristics of the software product;

a design requirement object that specifies one or more design characteristics of the software product;

a marketing requirement object that specifies one or more marketing characteristics of the software product;

a customer requirement object that specifies one or more characteristics that are requested by a customer of the software product;

a security requirement object that specifies one or more security characteristics of the software product;

a hardware requirement object that specifies one or more hardware characteristics of the software product; and a test-case requirement object that specifies one or more test cases that need to be performed in the development of the software product.

8. The computer-implemented method as recited in claim 1, wherein the one or more configuration management objects include at least one of:

an item object that comprises a file and attribute information associated with the file, wherein the attribute information comprises a version of the file;

a change request object that comprises metadata information indicating one or more issues associated with the development of the software product; and a development task object that comprises metadata information indicating one or more development tasks that need to be performed in the development of the software product.

9. The computer-implemented method as recited in claim 1, wherein:

creating and storing the baseline further comprises including a copy of the particular requirement object into the baseline, wherein the copy of the particular requirement object includes a specific version of the particular requirement object; and the specific versions of the one or more configuration management objects and the specific version of the particular requirement object are associated with a specific project version of the software product.

10. The computer-implemented method as recited in claim 1, wherein:

the particular requirement object comprises a plurality of sub-requirement objects;

the one or more configuration management objects comprise a plurality of development task objects; and storing the relationship information further comprises storing a plurality of links as at least part of the relationship information, wherein a particular link of the plurality of links associates a particular development task object of the plurality of development task objects with a particular sub-requirement object of the plurality of sub-requirement objects.

11. The computer-implemented method as recited in claim 1, wherein determining the one or more configuration management objects further comprises:

inspecting the relationship information to determine which configuration management objects, from the set of configuration management objects, are associated with the particular requirement object;

determining that the one or more configuration management objects are those configuration management objects, from the set of configuration management objects, that are associated with the particular requirement object; and comparing one or more criteria to attribute information of the one or more configuration management objects in order to determine the specific versions of the one or more configuration management objects that are to be included in the baseline.

12. The computer-implemented method as recited in claim 1, further comprising:

determining a requirement object from the collection of requirement objects that is different than the particular requirement object; and determining at least one configuration management object, from the set of configuration management objects, that is associated with the different requirement object based on the relationship information;

wherein creating and storing the baseline further comprises excluding any copies of the at least one configuration management object from the baseline.

13. The computer-implemented method as recited in claim 1, further comprising:

based on the relationship information, generating impact analysis information which indicates that the one or more configuration management objects would be affected by a change to the particular requirement object; and providing the impact analysis information to a user.

14. A non-transitory machine-readable medium comprising one or more stored instructions which, when processed by one or more processors, cause:

storing relationship information that associates a collection of requirement objects with a set of configuration management objects;

wherein the collection of requirement objects is defined in a requirement management system for a software product;

wherein the set of configuration management objects is defined in a configuration management system that is operable to manage the development of the software product;

determining, based on the relationship information, one or more configuration management objects, from the set of configuration management objects, that are associated with a particular requirement object; and creating and storing a baseline that includes copies of the one or more configuration management objects, wherein the copies of the one or more configuration management objects include specific versions of the one or more configuration management objects.

15. The non-transitory machine-readable medium as recited in claim 14, wherein the instructions that cause creating and storing the baseline further comprise instructions which, when processed by the one or more processors, cause including a copy of the particular requirement object into the baseline, wherein the copy of the particular requirement object includes a specific version of the particular requirement object.

16. The non-transitory machine-readable medium as recited in claim 15, wherein the one or more stored instructions further comprise instructions which, when processed by the one or more processors, cause storing audit trail information, wherein the audit trail information associates the baseline with the specific version of the particular requirement object.

17. The non-transitory machine-readable medium as recited in claim 14, wherein:

each requirement object in the collection of requirement objects is a set of data that specifies one or more intended characteristics of the software product; and each configuration management object of the set of configuration management objects is used in the development of the software product.

18. The non-transitory machine-readable medium as recited in claim 14,
further comprises instructions which, when processed by the one or more processors, cause determining that a change has been made to the particular requirement object; and
wherein the instructions that cause determining the one or more configuration management objects further comprise instructions which, when processed by the one or more processors, cause:
inspecting the relationship information to determine which configuration management objects, from the set of configuration management objects, are affected by the change made to the particular requirement object; and
determining that the one or more configuration management objects are those configuration management objects, from the set of configuration management objects, that are affected by the change made to the particular requirement object.

19. The non-transitory machine-readable medium as recited in claim 14, wherein the instructions that cause storing the relationship information further comprise instructions which, when processed by the one or more processors, cause:
receiving first input that identifies the particular requirement object in the collection of requirement objects;
receiving second input that identifies the one or more configuration management objects in the set of configuration management objects; and
storing one or more links as at least part of the relationship information based on the first input and the second input, wherein the one or more links respectively identify the one or more configuration management objects in association with the particular requirement object.

20. The non-transitory machine-readable medium as recited in claim 14, wherein the particular requirement object is one or more of:
a functional requirement object that specifies one or more functional characteristics of the software product;
a design requirement object that specifies one or more design characteristics of the software product;
a marketing requirement object that specifies one or more marketing characteristics of the software product;
a customer requirement object that specifies one or more characteristics that are requested by a customer of the software product;
a security requirement object that specifies one or more security characteristics of the software product;
a hardware requirement object that specifies one or more hardware characteristics of the software product; and
a test-case requirement object that specifies one or more test cases that need to be performed in the development of the software product.

21. The non-transitory machine-readable medium as recited in claim 14, wherein the one or more configuration management objects include at least one of:
an item object that comprises a file and attribute information associated with the file, wherein the attribute information comprises a version of the file;
a change request object that comprises metadata information indicating one or more issues associated with the development of the software product; and
a development task object that comprises metadata information indicating one or more development tasks that need to be performed in the development of the software product.

22. The non-transitory machine-readable medium as recited in claim 14, wherein:
the instructions that cause creating and storing the baseline further comprise instructions which, when processed by the one or more processors, cause including a copy of the particular requirement object into the baseline, wherein the copy of the particular requirement object includes a specific version of the particular requirement object; and
the specific versions of the one or more configuration management objects and the specific version of the particular requirement object are associated with a specific project version of the software product.

23. The non-transitory machine-readable medium as recited in claim 14, wherein:
the particular requirement object comprises a plurality of sub-requirement objects;
the one or more configuration management objects comprise a plurality of development task objects; and
the instructions that cause storing the relationship information further comprise instructions which, when processed by the one or more processors, cause storing a plurality of links as at least part of the relationship information, wherein a particular link of the plurality of links associates a particular development task object of the plurality of development task objects with a particular sub-requirement object of the plurality of sub-requirement objects.

24. The non-transitory machine-readable medium as recited in claim 14, wherein the instructions that cause determining the one or more configuration management objects further comprise instructions which, when processed by the one or more processors, cause:
inspecting the relationship information to determine which configuration management objects, from the set of configuration management objects, are associated with the particular requirement object;
determining that the one or more configuration management objects are those configuration management objects, from the set of configuration management objects, that are associated with the particular requirement object; and
comparing one or more criteria to attribute information of the one or more configuration management objects in order to determine the specific versions of the one or more configuration management objects that are to be included in the baseline.

25. The non-transitory machine-readable medium as recited in claim 14, wherein the one or more stored instructions further comprise instructions which, when processed by the one or more processors, cause:
determining a requirement object from the collection of requirement objects that is different than the particular requirement object; and
determining at least one configuration management object, from the set of configuration management objects, that is associated with the different requirement object based on the relationship information;
wherein the instructions that cause creating and storing the baseline further comprise instructions which, when processed by the one or more processors, cause excluding any copies of the at least one configuration management object from the baseline.

26. The non-transitory machine-readable medium as recited in claim 14, wherein the one or more stored instructions further comprise instructions which, when processed by the one or more processors, cause:

based on the relationship information, generating impact analysis information which indicates that the one or more configuration management objects would be affected by a change to the particular requirement object; and providing the impact analysis information to a user.

* * * * *